Sept. 6, 1949.                T. K. RIGGEN                 2,481,347
                       PHOTOELECTRIC COUNTING DEVICE
Filed Oct. 28, 1946                                   3 Sheets-Sheet 1
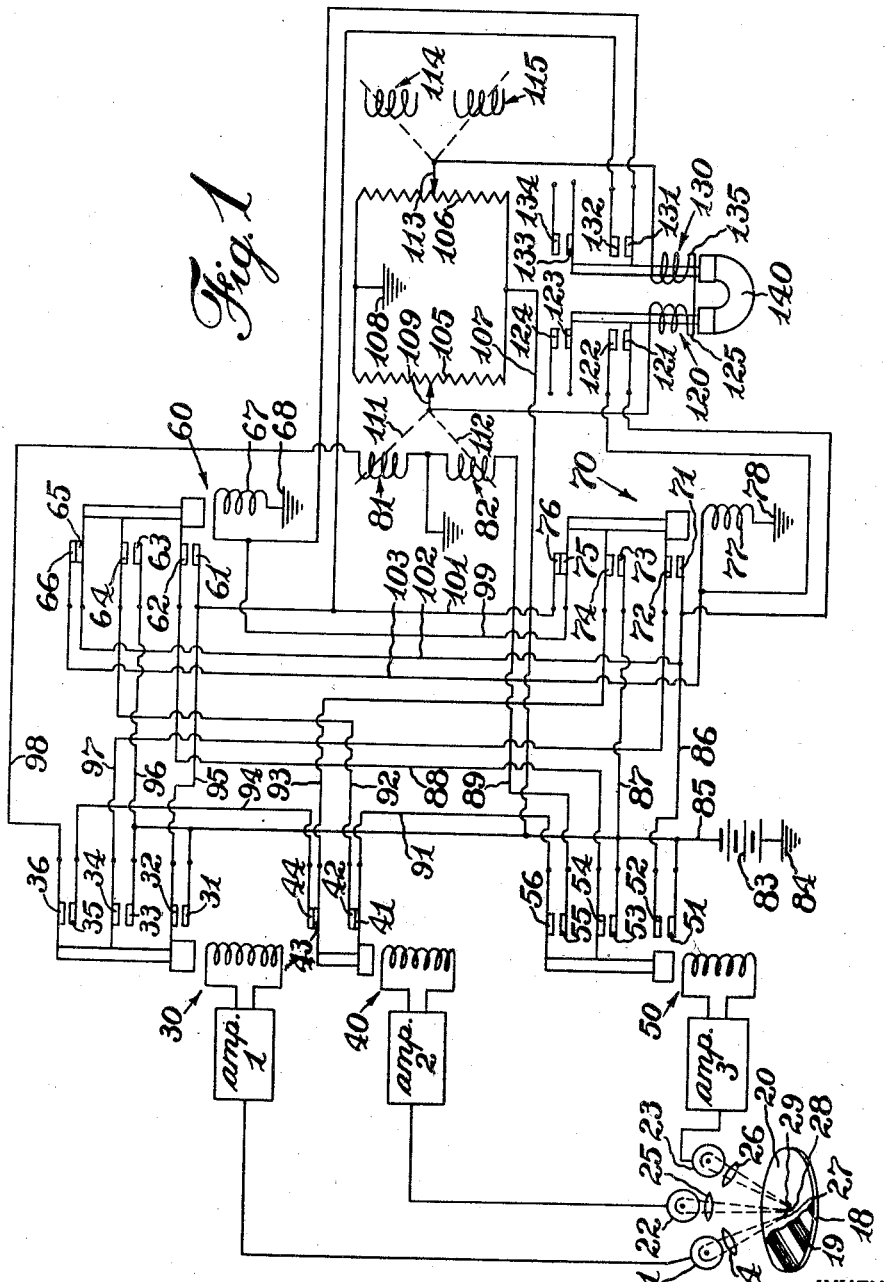
WITNESS:                                        INVENTOR.
                                          BY  Theodore K. Riggen
                                              Clinton S. James
                                                    ATTORNEY Sept. 6, 1949.   T. K. RIGGEN   2,481,347
PHOTOELECTRIC COUNTING DEVICE
Filed Oct. 28, 1946   3 Sheets-Sheet 2
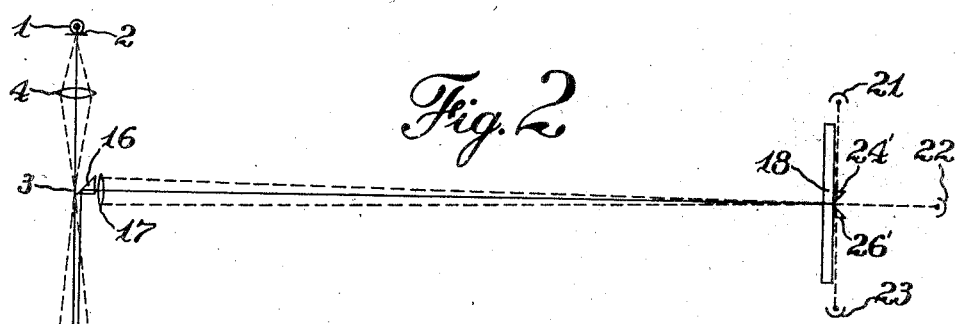
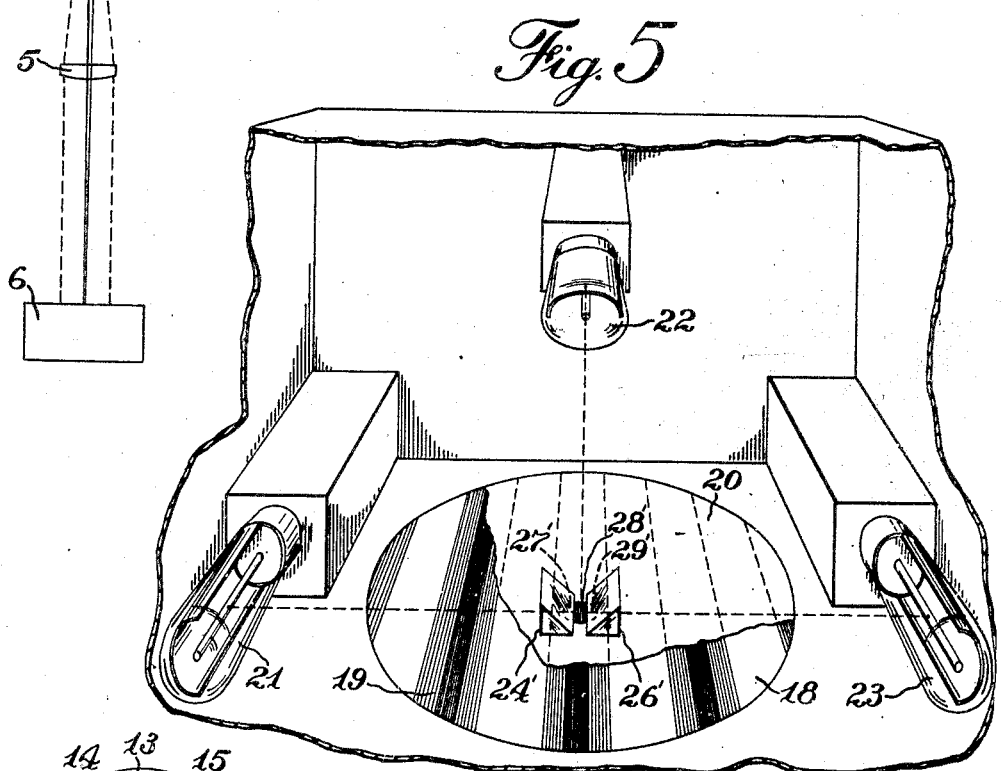
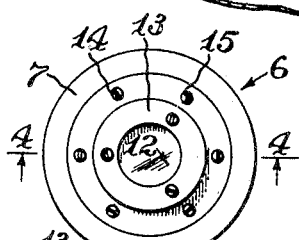
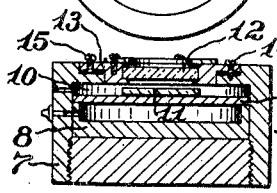
INVENTOR.
Theodore K. Riggen
BY
Clinton S. James
ATTORNEY

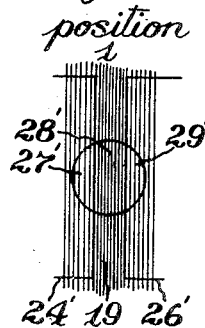
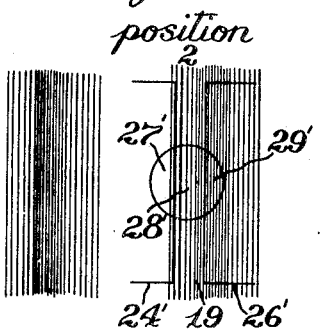
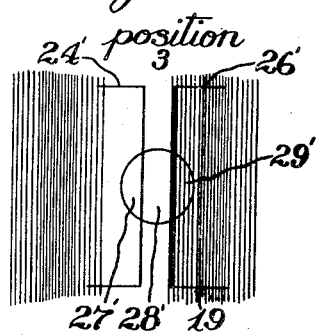
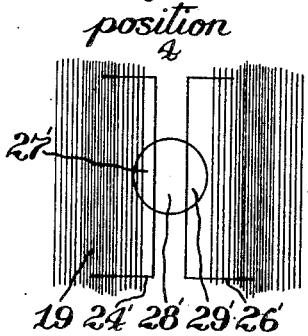
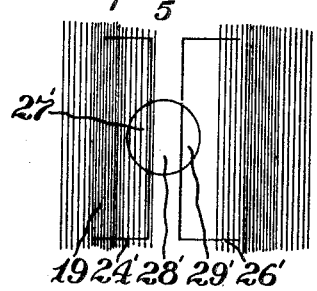
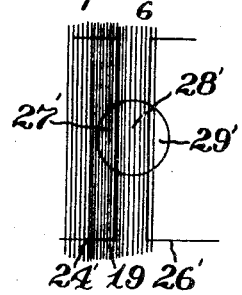

Patented Sept. 6, 1949

2,481,347

UNITED STATES PATENT OFFICE 2,481,347

PHOTOELECTRIC COUNTING DEVICE

Theodore K. Riggen, Elmira, N. Y., assignor to Bendix Aviation Corporation, Elmira Heights, N. Y., a corporation of Delaware Application October 28, 1946, Serial No. 706,209

8 Claims. (Cl. 318—489)

The present invention relates to a photoelectric counting device and more particularly to a photoelectric device for counting a procession of observable phenomena traversing a viewing means, said counter being arranged to add when the motion of the phenomena is in one direction and to subtract when the motion is in the opposite direction.

One preferred form of the present invention, as hereafter set forth, is a device for counting light fringes traversing the field of view of an interferometric type of barometric altimeter such as set forth in Patent to Hurley 2,410,502 dated November 5, 1946, so as to make it possible to identify the fringe corresponding to any pre-selected barometric pressure. It also contemplates means for producing a signal or actuating a control mechanism such as the elevators of an airplane in accordance with the direction of motion of the pre-selected fringe from the center of the field of view.

It is an object of the present invention to provide a novel device of the character above set forth which will operate reliably irrespective of reversals in the direction of motion of the observable phenomena and regardless of the amplitude of such reversal.

It is another object to provide such a device which is capable of counting at speeds in the order of 20 units per second.

It is another object to provide such a device which is well adapted for the automatic control of an airplane so as to maintain flight substantially at a pre-set altitude.

It is another object to provide such a device in in which the altitude setting may readily be changed by remote control.

Further objects and advantages will be apparent from the following description taken in connection with the accompanying drawings, in which:

Fig. 1 is a diagrammatic representation of a preferred embodiment of the invention as used to count interferometric light fringes;

Fig. 2 is a diagrammatic representation of an interferometric altimeter with photoelectric means for observing the fringes produced thereby;

Fig. 3 is an enlarged plan view of the pressure sensitive element of the altimeter;

Fig. 4 is a vertical section taken substantially on the line 4—4 of Fig. 3;

Fig. 5 is a further enlarged detail in perspective of the fringe plate and photoelectric means for observing the fringes;

Figs. 6 to 11 inclusive are enlarged semi-diagrammatic details showing successive steps in the passage of an interferometric fringe past the observation areas; and Fig. 12 is a diagrammatic illustration of the variations in the output of the photoelectric observing means as interferometric fringes traverse the observation areas.

Referring first to Fig. 2 of the drawing for an understanding of the environment of the present invention, there is illustrated a source 1 of monochromatic light which is allowed to pass through a small opening in a diaphragm 2. The light emerging from said opening is focused at a point 3 by a lens 4, and the beam diverging from said focal point brought into parallelism by a collimating lens 5 so as to strike the upper surface of a pressure-sensitive element 6 substantially normal thereto.

As best seen in Figs. 3 and 4, the element 6 which is responsive to atmospheric pressure comprises a rigid frame or case 7 in which is mounted a hermetically sealed cell 8 which is preferably evacuated. The cell 8 has an upper wall 9 which is slightly flexible, and the space 10 above the wall or diaphragm 9 is vented to the atmosphere, so that variations in atmospheric pressure cause the diaphragm to flex slightly in a vertical direction.

Centrally mounted on the diaphragm 9 is an optical flat 11 of quartz or any other suitable material, the upper surface of which is optically plane, and a second optical flat 12 of quartz or other suitable transparent material having its lower surface optically plane is mounted in the top of the casing 7 above the flat 11 in spaced substantially parallel relation thereto. Flat 12 is preferably mounted in a bezel 13 having provision for slight angular adjustment by means of tension screws 14 and pressure screws 15 so that the adjacent surfaces of flats 11 and 12 may be brought into the proper substantially parallel relationship.

The parallel light beam from the source 1 is partially reflected by the lower surface of the flat 12 and the remainder is reflected by the upper surface of the flat 11, and the portions of the radiant energy thus reflected by the flats interfere by reason of diversities in phase relation. The reflected beam is converged by the lens 5 onto a prism 16, and the interference pattern is focused by a lens 17 on a suitable diffusing screen or plate 18 where the pattern appears as a series of light and dark fringes indicated at 19 in Fig. 5.

Variations in the distance between the adjacent surfaces of flats 11 and 12 cause the fringes 19 to traverse the field of view of the screen 18 in a direction normal to the fringes, whereby the passage of the fringes across a selected area of the field of view provides a highly magnified record of such variations in spacing of the flats. Since the flat 11 moves up and down with the flexing of the diaphragm 9 of the barometric cell 8, the passage of the fringes 19 across the screen 18 affords a highly sensitive indication of variations in atmospheric pressure.

In Fig. 1 of the drawing, there is illustrated photo-electric means for observing and counting the passage of a procession of such interferometric fringes, and for signalizing the passage of any pre-selected fringe corresponding to a certain barometric pressure and consequently to a predetermined altitude of an airplane to be controlled. It will be understood that the barometric pressure may be interpreted as altitude above a reference plane, and that the signal produced by the device may be used to actuate the controls of an airplane in order to maintain flight at a predetermined level. As there shown, a plurality of photoelectric cells 21, 22 and 23 are provided with optical systems indicated at 24, 25 and 26 respectively for directing the light from adjacent small areas 27, 28 and 29 of the field of view onto said photocells.

The selected areas may be in the form of pinhole apertures in a mask 20 placed over the diffusing plate 18, and the optical systems may comprise projection lenses, as illustrated in Fig. 1. An alternative structure is shown in Figs. 2 and 5 in which the selected areas to be observed are contiguous portions 27', 28' and 29' of an aperture in the mask 20, and the optical systems comprise a pair of prisms 24', 26' arranged to intercept the light from opposite segments 27', 29' of the aperture and direct it onto photocells 21 and 23 respectively, while the light from the central portion is allowed to fall directly on photocell 22.

The selected areas are arranged as shown in a line which is substantially normal to the direction of motion of the interferometric fringes as they traverse the field of view. The outputs from the photoelectric cells are amplified by means of suitable amplifiers labelled Amp 1, Amp 2 and Amp 3 respectively and are used to cause energization of relays indicated generally by numerals 30, 40 and 50. Relay 30 is provided with three sets of normally open contacts 31—32, 33—34 and 35—36. Relay 40 is provided with two sets of contacts 41—42, 43—44 which are normally closed. Relay 50 is provided with three sets of normally open contacts 51—52, 53—54 and 55—56.

There is also provided a pair of secondarily operated relays indicated generally by numerals 60 and 70, relay 60 having two sets of normally open contacts 61—62 and 63—64 and one set of normally closed contacts 65—66, while relay 70 similarly has two sets of normally open contacts 71—72 and 73—74 and one set of normally closed contacts 75—76.

The output of this relay system is used to actuate selectively a totalizing mechanism comprising a pair of counters or stepping devices indicated by numerals 81 and 82. The steppers are arranged to have opposite effects on the totalizing or signaling mechanism, and the determination as to which stepper is operated is determined by the sequence in which the photoelectric cells observe the passage of the interferometric fringes, in other words in accordance with the direction of traverse of the interferometric fringes across the field of view. The steppers 81 and 82 thus cause the totalizing mechanism to record the total number of fringes passing the observed area.

A source of power to actuate the various relays is provided in the form of a battery 83 grounded at 84 and connected by a lead 85 to contacts 51 and 53 of relay 50, and 31 and 33 of relay 30. Contacts 52 and 71 are connected by a lead 86, contacts 53 and 73 are connected by a lead 87, contacts 54 and 62 are connected by a lead 88, contact 55 is connected by a lead 89 to actuate the stepper 82, and contact 56 is connected to contact 41 by a lead 91. Contact 42 is connected by a lead 92 to contact 64, contact 43 is connected by a lead 93 to contact 74, and contact 44 is connected by a lead 94 to contact 35. Contact 32 is connected by a lead 95 to contact 61, contact 33 is connected by lead 96 to contact 63, contact 34 is connected by lead 97 to contact 72, and contact 36 is connected by lead 98 to the stepper 81. Contact 75 is connected by lead 99 to the electromagnet 67 which actuates relay 60, and contact 76 is connected by lead 101 to contact 61. Contact 65 is connected by lead 102 to the lead 86, and contact 66 is connected by lead 103 to the coil 77 for actuating relay 70. Relay coils 67 and 77 are grounded as indicated at 68 and 78 respectively to complete their actuating circuits.

The totalizing mechanism comprising steppers 81 and 82 is used to operate a signaling device comprising two resistors or potentiometers 105 and 106 connected in parallel, one end of both the resistors being connected through a lead 107 to the battery lead 85, and the other ends being grounded at 108. The movable arm 109 of potentiometer 105 is arranged to be moved in opposite directions by the steppers 81, 82 in any suitable manner as indicated conventionally by the dotted lines 111, 112, and the movable arm 113 of potentiometer 106 is arranged to be similarly moved by steppers 114 and 115 which may be actuated by manual control either directly or through any suitable remote controlling device so as to set the arm 113 at any pre-selected point on the potentiometer 106. It will thus be seen that the potentiometers form in effect a bridge circuit in which the relative potentials of the arms 109, 113 depend upon their relative distances from the ends of the bridge.

A pair of polarized relays 120 and 130 are arranged to actuate any desired form of indicating devices to show when and in what direction the potentiometer arm 109 is displaced from exact opposition to the potentiometer arm 113. Relay 120 is provided with normally open contacts 121, 122 and with normally open signal contacts 123, 124. Similarly, relay 130 is provided with normally open contacts 131, 132 and normally open signal contacts 133, 134. A permanent magnet 140 is arranged to hold the contacts of relays 120 and 130 normally open, while electromagnet 125 of relay 120 and electromagnet 135 of relay 130 are arranged to counteract the permanent magnet and cause the corresponding relays to close their contacts when current is flowing in a downward direction through the coils. Coils 125 and 135 are connected in series between the potentiometer arms 109 and 113 whereby when current flows from arm 109 to arm 113 relay 120 will be caused to close its contacts, whereas when the current flows in a reverse direction relay 130 will close its contacts. The signal contacts 123, 124 and 133, 134 may be used to operate in opposite directions the elevator of an airplane in the manner of an automatic pilot.

In this manner, an arrangement is provided which counts the fringes passing the observing station in the field of view of the altimeter, and recognizes the passage of a predetermined number of fringes. The device then gives a signal to the automatic pilot which will cause the plane in which the device is carried to level off at the preselected altitude as indicated by the barometric pressure observed by the interferometric device.

In setting forth the operation of the device, reference is made to Fig. 12 of the drawing which indicates diagrammatically the relation of the outputs of the photocells as the fringes pass through the areas 27, 28 and 29 observed by said photocells. It will be noted that the output of the photocells is somewhat in the nature of a rectified three-phase alternating current, each phase corresponding to the output of one of the photocells 21, 22, 23 as indicated. The operation of the device will be analyzed by considering the changes brought about as an airplane carrying the device passes through changes in altitude corresponding to the positions numbered 1, 2, 3, 4, 5, 6, which together constitute one complete cycle of passage of a fringe through the observation station.

In order to follow through the operation, it is assumed that the plane is flying at an altitude corresponding to position 1 in Fig. 12, and that it will travel through positions 2, 3, 4, 5, and 6. As position 2 is reached, photocell 21 will cause a signal to pass through the amplifier 1 which will energize relay 30 to close its contacts. Contacts 31 and 32 connect the battery through contacts 75 and 76 of relay 70 to the coil 67 of relay 60 causing it to operate. Contacts 33 and 34 connect the battery to contact 72 of relay 70. Contacts 35 and 36 connect contact 74 of relay 70 through contacts 43 and 44 of relay 40 to the stepper 81. Since relay 70 has not yet been actuated, however, the only action caused by the operation of relay 30 was the energization of relay 60. Contacts 61 and 62 of relay 60 complete a connection from coil 67 of relay 60 through contacts 75 and 76 to contact 54 of relay 50 which is open. Contacts 63 and 64 of relay 60 connect the battery through contacts 41 and 42 of relay 40 to contact 56 of relay 50 which is open. Contacts 65 and 66 of relay 60 being opened disconnect the coil 77 of relay 70 from contact 71 and therefore prevent energization of relay 70.

Proceeding to position 3, wherein photocell 22 delivers sufficient signal through amplifier 2 to cause relay 40 to operate, contacts 41 and 42 of relay 40 in opening disconnect contact 56 of relay 50 from contact 64 of relay 60. Contacts 43 and 44 of relay 40 by opening disconnect contact 35 of relay 30 from contact 74 of relay 70. Since neither of these partial circuits were energized previously, the actuation of relay 40 causes nothing to happen.

Proceeding now to position 4, wherein photocell 23 delivers sufficient current through amplifier 3 to cause relay 50 to close, contacts 51 and 52 of relay 50 connect the battery to contact 71 of relay 70 which is open, and to contact 121 of relay 120 which is open, and to contact 65 of relay 60 which also is open. Contacts 53 and 54 of relay 50 connect the battery to contact 62 of relay 60, which through contact 61 of relay 60 and contacts 76 and 75 of relay 70 supplies holding current to the coil 67 of relay 60. Contacts 55 and 56 of relay 50 connect contact 41 of relay 40, which is open, to the stepper 82. The operation of relay 50 therefore caused no change except the locking down of relay 60.

Moving now to position 5, in this position the signal delivered by photocell 21 through amplifier 1 is no longer sufficient to maintain energization of relay 30 which accordingly releases. The opening of contacts 31 and 32 thereby breaks the connection from the battery through contacts 76 and 75 of relay 70 to the coil 67 of relay 60. However, the energization of relay 60 is maintained through contacts 53 and 54 of relay 50. The opening of contacts 33 and 34 of relay 30 disconnects the battery from contact 72 of relay 70 which is open. The opening of contacts 35 and 36 disconnects contact 44 of relay 40, which is open, from the stepper 81. It will be seen that no change in the conditions of the relays was made by the opening of relay 30.

Moving now to position 6, at this position photocell 22 no longer delivers sufficient signal through the amplifier 2 to maintain the energization of relay 40. Contacts 43 and 44 of relay 40 therefore close and connect contact 35 of relay 30, which is now open, to contact 74 of relay 70 which is also open. Contacts 41 and 42 of relay 40 by closing connect the battery through contacts 63 and 64 of relay 60 and contacts 56 and 55 of relay 50 to the stepper 82. Stepper 82 accordingly operates, causing the potentiometer arm 109 to move one increment in a downward direction. Current then flows from the battery through the lower portion of the resistor 105, the arm 109, relay coils 125 and 135, potentiometer arm 113 and the upper portion of resistor 106 to the ground. Current flowing in the direction just described will cause the polarized relay 120 to release and allow its contacts to close. Contacts 121 and 122 of relay 120 connect the coil 77 of relay 70 to contact 52 of relay 50 and through contact 51 to the battery whereby coil 77 is energized and the relay 70 pulls down. Contacts 71 and 72 thereby close and connect the relay coil 77 through contacts 121 and 122 to contact 34 of relay 30 which is open. Contacts 73 and 74 of relay 70 connect the battery through contacts 43 and 44 of relay 40 to contact 35 of relay 30 which is open. Contacts 75 and 76 of relay 70 by opening disconnect coil 67 of relay 60 from contact 61 which had been receiving current through contact 62 and contact 54 of relay 50. Relay 60 is thereby deenergized opening contacts 63, 64 which releases the stepper 82, leaving the potentiometer arm 109 in corrected position. At the same time, closure of contacts 123 and 124 of relay 120 provides a signal to the automatic pilot.

It is assumed that the automatic pilot corrects the flight of the plane in such a way that the plane moves back through positions corresponding to 5, 4, 3, 2 and 1 of Fig. 12. As position 5 is reached, photocell 22 delivers sufficient signal through amplifier 2 to relay 40 to energize relay 40. Contacts 41 and 42 on relay 40 by opening disconnect the stepper 82 and contacts 55 and 56 of relay 50 from contact 64 of relay 60.

Since the potentiometer arm 109 remains in displaced position, the correcting effect of the automatic pilot is maintained, causing the plane to continue to move toward position 4 at which position photocell 21 delivers sufficient signal to energize relay 30. Contacts 31 and 32 of relay 30 would connect the battery to the coil 67 of relay 60 except that contacts 75 and 76 of relay 70 are open since relay 70 is energized. Contacts 33 and 34 on relay 30 connect the battery to the contact 72 of relay 70, and through contact 71 thereof and contacts 121 and 122 of relay 120 complete a locking circuit to maintain the energization of relay 70. Contacts 36 and 35 of relay 30 connect contact 44 of relay 40, which is opened, to the stepper 81.

Proceeding now to position 3, in this position photocell 23 ceases to produce sufficient output to cause energization of relay 50 which accordingly releases. Contacts 51 and 52 thereupon disconnect the battery from the coil 77 of relay 70 which had been connected through contacts 121 and 122 of relay 120. Relay 70 however continues to be connected to the battery by the locking circuit including contacts 71 and 72 of relay 70, contacts 65 and 66 of relay 60, and contacts 34 and 33 of relay 30. Contacts 53 and 54 of relay 50 by opening disconnect contact 62 of relay 60, which is open, from contact 73 of relay 70. Contacts 55 and 56 of relay 50 in opening disconnect the stepper 82 from contact 41 of relay 40 which is open. No action was therefore accomplished by the opening of relay 50 further than the opening of the holding circuit for relay 70.

Proceeding to position 2, in this position photocell 22 ceases to produce sufficient output to maintain relay 40 energized, which therefore releases and closes its contacts. Contacts 41 and 42 thereupon connect contact 56 of relay 50, which is open, to contact 64 of relay 60 which is open. Contacts 43 and 44 connect the battery through contacts 73 and 74 of relay 70 and contacts 35 and 36 of relay 30 to the stepper 81. Stepper 81 is therefore operated and moves the potentiometer arm 109 one increment in the opposite direction to the previous movement thereof, thus restoring the balance in the bridge 105, 106, and allowing the magnet 125 to open the contacts of polarized relay 120. Contacts 121 and 122, by opening, disconnect contact 71 of relay 70 from the coil 77 of said relay, but the relay is held closed by the locking circuit through contacts 33 and 34 of relay 30, contacts 71 and 72 of relay 70 and contacts 65 and 66 of relay 60. The opening of contacts 123 and 124 of relay 120 remove the signal from the automatic pilot.

Assuming that the plane continues in such a direction that position 1 is attained, photocell 21 thereupon ceases to produce sufficient output to maintain energization of relay 30. Contacts 31 and 32 by thus opening disconnect the battery from contact 61 of relay 60, which is open, from contact 76 of relay 70 which is open and contacts 132 of relay 130 which is also open. Contacts 33 and 34 of relay 30 by opening disconnect the battery from contacts 71 and 72 of relay 70 which breaks the circuit through the coil 77 thereof causing relay 70 to release. Contacts 35 and 36 of relay 30 by opening disconnect contact 44 of relay 40 from stepper 81. It will thus be seen that all relays are in their normal position and the potentiometer arm 109 has been restored to its original position.

If, when the signal was transmitted to the automatic pilot by the first displacement of the potentiometer arm 109 in a downward direction, the automatic pilot fails to immediately correct the flight of the plane so that the plane drifts on from position 6 to position 1', then the photocell 23 does not produce sufficient output to maintain the operation of relay 50 which therefore opens. Contacts 51 and 52 of relay 50 by opening disconnect the battery from coil 77 of relay 70 which had been energized through contacts 65 and 66 of relay 60. Relay 70 therefore releases. Contacts 53 and 54 of relay 50 by opening disconnect the battery from contact 62 of relay 60 which is open. Contacts 55 and 56 of relay 50 by opening disconnect the stepper 82 from contact 41 of relay 40. Contacts 73 and 74 of relay 70 by opening disconnect the battery from contact 43 of relay 40. Contacts 75 and 76 of relay 70 by closing connect the coil 67 of relay 60 to contact 61 of said relay which is open, and to contact 132 of relay 130 which is also open. It will be noted that the potentiometer arm 109 is still in the position in which the stepper 82 left it. The bridge 105, 106 is still unbalanced, and the contacts of the polarized relay 120 are still closed. Contacts 123 and 124 therefore continue to give the correcting signal to the automatic pilot.

If the plane should proceed through positions corresponding to the next interferometric fringe as shown in the second group of figures 1', 2', 3', 4', 5' and 6' in Fig. 12, the potentiometer arm 109 will move one more increment in the downward direction, while the contacts of relay 120 will remain closed.

It will be understood that the balance of bridge 105, 106 as related to the sensitivity of the polarized relays 120 and 130 must be such that the relays will be actuated by the movement of the potentiometer arms through one increment. However, the movement of the potentiometer arms through their entire scope must not cause sufficient current to flow through the relay coils 125 and 135 to overcome the polarization of the permanent magnet 140 so as to reopen the relay contacts.

From the above discussion, it will be apparent that the potentiometer arm 113 can be pre-set to any position on the resistor 106, and that a signal will be transmitted to the automatic pilot until such time as the potentiometer arm 109 is moved to a position exactly opposite the potentiometer arm 113. At the start of a flight, the potentiometer arm 109 will be at a position corresponding to ground level, and the arm 113 is set at the position corresponding to the desired altitude at which the plane is to fly, whereby the signal contacts 123, 124 will cause the automatic pilot to place the controls of the plane in position to climb. As successively higher levels are passed through by the plane, the potentiometer arm 109 will be stepped along the resistor 105 until the bridge is balanced, whereupon the automatic pilot will operate to level off the plane.

If the plane rises or falls, the potentiometer arm 109 will move along the resistor 105 in such a way to cause relays 120 and 130 to give the proper correction signal to the automatic pilot which will then correct the flight of the ship accordingly. In order to allow for change of altitude during the flight, the steppers 114 and 115 for the potentiometer arm 113 may be actuated either by a pre-set mechanism, or by radio control. This permits maneuverability in flight as well as stable flight irrespective of variations in barometric pressure.

Although certain specific structure has been illustrated and described, it will be understood that variations in the precise form of the elements and the relationships thereof may be incorporated without departing from the spirit of the invention as set forth in the claims appended hereto.

What is claimed is:

1. Photoelectric means for counting a procession of spaced units in a field of view including a plurality of photoelectric cells, means causing said cells to observe adjacent portions of the field of view arranged in a line substantially parallel to the direction of movement of said procession, totalizing means, and means actuated by the photoelectric cells causing the totalizing means to add when said units are observed by the photoelectric cells in one order, and to subtract when the units are observed in the reverse order.

2. Photoelectric counting means as set forth in claim 1 in which said means for controlling the totalizing means includes a plurality of electrical relays actuated in sequence by the photoelectric cells.

3. Photoelectric counting means as set forth in claim 1 in which said means for controlling the totalizing means includes a plurality of electrical relays actuated in sequence by the photoelectric cells, said relays being so interrelated that their combined action is necessary to actuate the totalizing means, and the sequence of their action determines the direction in which the totalizing means is actuated.

4. Photoelectric counting means as set forth in claim 1 including further, means actuated by the totalizing means for operating a signal when the total count varies from a pre-selected value.

5. Photoelectric counting means as set forth in claim 1 including further, a direction-controlling mechanism operable in opposite directions, and means actuated by the totalizing means for operating the direction-controlling mechanism in one direction when the total count is less than a pre-selected value, and in the other direction when the total count is greater than the pre-selected value.

6. In combination with means for producing a procession of interferometric fringes across a field of view, photoelectric means for counting the total number of fringes that pass through selected areas of said field in a given direction, and for subtracting from said total the number of fringes that pass through said areas in the reverse direction.

7. The combination set forth in claim 6 including further, means for actuating a signal when said total varies in either direction from a predetermined value.

8. In combination with means for causing a procession of observable phenomena to traverse a field of view, means including a plurality of photoelectric devices for observing adjacent portions of the field of view arranged in a line substantially parallel to the direction of motion of said phenomena so as to cause said phenomena to be observed by the photoelectric devices in sequence, and means actuated by the photoelectric devices for totaling the number of said phenomena observed by said devices, including further, means controlled by the totalizing means for producing a signal when the photoelectric devices have observed a predetermined number of said phenomena.

THEODORE K. RIGGEN.

REFERENCES CITED

The following references are of record in the file of this patent:

UNITED STATES PATENTS

| Number | Name | Date |
|---|---|---|
| 1,995,881 | Cockrell | Mar. 26, 1935 |
| 2,037,191 | Backer | Apr. 14, 1936 |
| 2,047,665 | Beggs | July 14, 1936 |
| 2,091,562 | Palmer | Aug. 31, 1937 |
| 2,400,489 | Dana et al. | May 21, 1946 |
| 2,410,502 | Hurley | Nov. 5, 1946 |